(12) United States Patent
Shim et al.

(10) Patent No.: US 6,181,402 B1
(45) Date of Patent: Jan. 30, 2001

(54) LIQUID CRYSTAL DISPLAY

(75) Inventors: Jung-Uk Shim; Kyeong-Hyeon Kim; Nam-Heung Kim; Chang-Hun Lee; Seung-Beom Park, all of Yongin (KR)

(73) Assignee: Samsung Electronics Co., Ltd., Suwon (KR)

(*) Notice: Under 35 U.S.C. 154(b), the term of this patent shall be extended for 0 days.

(21) Appl. No.: 08/891,499

(22) Filed: Jul. 11, 1997

(30) Foreign Application Priority Data

May 30, 1997 (KR) .................................. 97-22308
Jun. 24, 1997 (KR) .................................. 97-26861

(51) Int. Cl.[7] ..................... A02F 1/1337; A02F 1/1343
(52) U.S. Cl. ..................... 349/130; 349/139; 349/143
(58) Field of Search .................................. 349/130, 141, 349/143, 139, 117

(56) References Cited

U.S. PATENT DOCUMENTS

| | | | |
|---|---|---|---|
| 5,493,426 | * 2/1996 | Johnson et al. | 349/40 |
| 5,532,854 | * 7/1996 | Fergason | 349/177 |
| 5,541,753 | * 7/1996 | Raynes et al. | 349/117 |
| 5,654,782 | * 8/1997 | Morokawa et al. | 349/143 |
| 5,668,651 | * 9/1997 | Yamada et al. | 349/156 |
| 5,694,188 | * 12/1997 | Sano et al. | 349/139 |
| 5,841,498 | * 11/1998 | Baur et al. | 349/141 |

FOREIGN PATENT DOCUMENTS 227 809 A1 * 9/1985 (DE).
53-89753 * 8/1978 (JP).

* cited by examiner

*Primary Examiner*—William L. Sikes
*Assistant Examiner*—Dung Nguyen
(74) *Attorney, Agent, or Firm*—Jones Volentine, L.L.C.

(57) ABSTRACT

Two electrodes in parallel with each other are formed on one of two substrates, homeotropic alignment films are formed on the substrates and a liquid crystal material having positive dielectric anisotropy is injected between the substrates. When the voltage is applied to the two electrodes, a parabolic electric field between the electrodes drives the liquid crystal molecules. Since the electric field generated is symmetrical with respect to the boundary-plane equal distance from each of the two electrodes, the liquid crystal molecules are symmetrically aligned with respect to the boundary-plane. The electric field does not exert influences the liquid crystal molecules on the boundary-plane since the electric field on the boundary-plane is parallel with the substrates and perpendicular to the two electrodes; and thus, it is perpendicular to the liquid crystal molecules. Here, the polarization of the light is changed while passing through the liquid crystal layer and as a result, only a part of the light passes through the polarizing plate. The transmittance of the light can be varied by controlling the magnitude of voltage applied to the two electrodes.

2 Claims, 18 Drawing Sheets

WHEN VOLTAGE IS NOT APPLIED

WHEN VOLTAGE IS APPLIED

WHEN VOLTAGE
IS NOT APPLIED

WHEN VOLTAGE
IS APPLIED

WHEN VOLTAGE
IS NOT APPLIED

WHEN VOLTAGE
IS APPLIED

WHEN VOLTAGE IS NOT APPLIED

CENTRAL SURFACE   CENTRAL SURFACE

WHEN VOLTAGE IS APPLIED

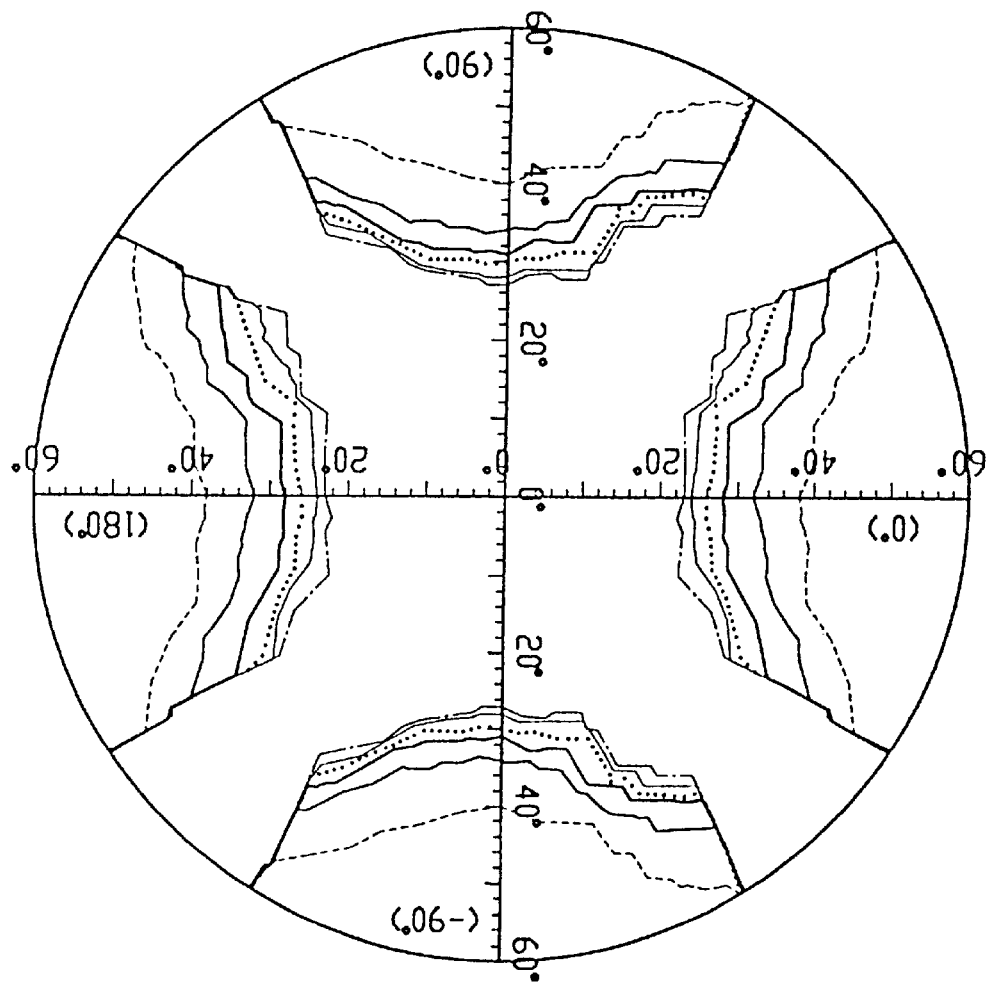
FIG.7
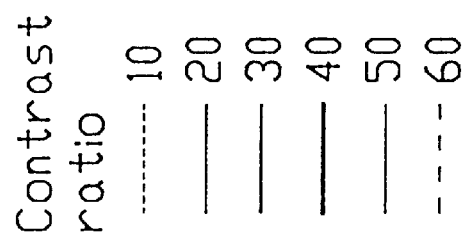

FIG. 9
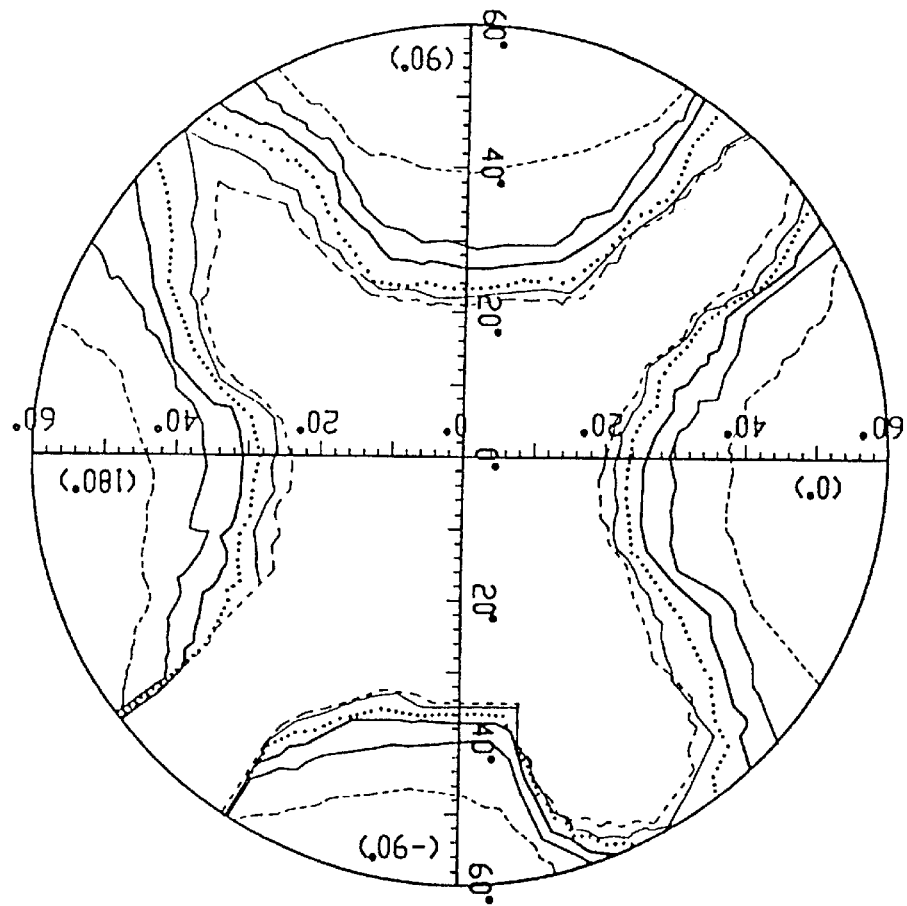
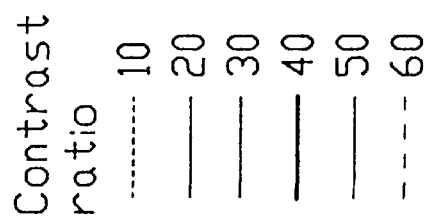

FIG. 18

| LIQUID CRYSTAL CELL GAP (μm) | DISTANCE BETWEEN ELECTRODES (μm) | VMAX (V) | TMAX (%) | ton (msec) | toff (msec) | ttot (msec) | V10 (V) | V90 (V) |
|---|---|---|---|---|---|---|---|---|
| 3 | 8 | 30.0 | 17.4 | 52.1 | 9.7 | 61.8 | 5.5 | 18.7 |
| 4 | 8 | 15.0 | 14.1 | 28.9 | 12.9 | 41.8 | 3.7 | 8.6 |
| 5 | 8 | 8.0 | 12.3 | 23.2 | 15.7 | 38.9 | 3.1 | 5.9 |
| 6 | 8 | 6.0 | 11.0 | 19.7 | 19.6 | 39.3 | 2.8 | 4.8 |
| 6 | 10 | 6.2 | 12.7 | 32.9 | 21.5 | 54.4 | 3.1 | 5.0 |

LIQUID CRYSTAL DISPLAY

BACKGROUND OF THE INVENTION (a) Field of the Invention

The present invention relates to a liquid crystal display.

(b) Description of the Related Art

Generally, a conventional liquid crystal display (LCD) comprises two substrates having electrodes and liquid crystal injected therebetween. Light transmittance is adjusted by controlling the intensity of voltage being applied to the electrodes.

Hereinafter, the conventional LCD is explained in detail with reference to the accompanying drawings.

FIGS. 1A and 1B are sectional views of a conventional twisted-nematic liquid crystal display (TN-LCD). The TN-LCD in FIG. 1A, comprises: transparent glass substrates 1 and 2 facing each other; a liquid crystal layer 7 inserted between the substrates 1 and 2; and electrodes 3 and 4 formed respectively on the inner surfaces of the transparent glass substrates 1 and 2; and two polarizing plates 5 and 6 attached to the outer surface of the glass substrates 1 and 2 respectively for polarizing the light.

The electrode 3 of the lower substrate 1 is a pixel electrode, and the electrode 4 of the upper substrate 2 is a common electrode, and dielectric anisotropy $\Delta\epsilon$ of the liquid crystal layer 7 is positive.

In the absence of an electric field, the long axis of the liquid crystal molecules 8 of the liquid crystal layer 7 is in parallel with the substrates 1 and 2, and the liquid crystal molecules 8 are twisted spirally from one substrate to the other substrate.

When a power V is connected to the electrodes 3 and 4, and sufficient electric field is present in the liquid crystal layer 7 in the direction of the arrow as illustrated in FIG. 1B, the major axis of the liquid crystal molecules 8 is in parallel with the direction of the electric field. This type of TN-LCD unfortunately results in having a narrow viewing angle.

To remedy this problem, a new method, an in-plane switching liquid crystal display (IPS-LCD), has been proposed recently. FIGS. 2A and 2B are sectional views of a conventional IPS-LCD. The main difference between the TN-LCD and the IPS-LCD lies with the placement of the electrodes 3 and 4.

Unlike the TN-LCD, both electrodes 3 and 4 of the IPS-LCD are formed on the same substrate, either upper or lower, in parallel to each other. In FIGS. 2A and 2B, the electrodes 3 and 4 are formed on the lower substrate 1 as an example. The dielectric anisotropy $\Delta\epsilon$ of the liquid crystal layer 7 may be positive or negative. The other reference numerals of FIGS. 2A and 2B represent the same elements of FIGS. 1A and 1B.

In the absence of an electric field, the long axis of the liquid crystal molecules 8 of the liquid crystal layer 7 is parallel with the two substrates 1 and 2, or has a predetermined angle with respect to the two electrodes 3 and 4.

When a power V is connected to the two electrodes 3 and 4, and sufficient electric field is applied, the generated electric field is substantially parallel with the substrates 1 and 2, and perpendicular to the electrodes 3 and 4. Accordingly, the long axis of the liquid crystal molecules 8 at the center of the liquid crystal layer 7 is parallel with the electric field.

On the other hand, the liquid crystal molecules 8, away from the center of the liquid crystal layer 7, has a spirally twisted substructure since the liquid crystal molecules 8 near the substrates 1 and 2 maintain their initial state due to the alignment force.

However, the IPS-LCD has the undesirable effects of a reduced contrast ratio due to light leakage in the dark state and the decreased response speed of the liquid crystal molecules,

SUMMARY OF THE INVENTION

An object of the present invention is to provide a liquid crystal display having (LCD) a wide viewing angle to substantially obviate the problems associated with the related art.

An LCD according to embodiments of the present invention is made by injecting a liquid crystal material having dielectric anisotropy between first and second substrates and aligning perpendicularly the liquid crystal molecules with respect to the two substrates. First and second electrodes are formed on one of the two substrates and made parallel with each other.

Alignment films for aligning molecular axes of the liquid crystal molecules perpendicularly with respect to the substrates may be formed on the first or the second substrate, and the alignment films may or may not be rubbed.

In addition, the LCD of the present invention may further include polarizing plates, and the transmission axes of the polarizing plates are parallel or perpendicular to each other.

Here, the dielectric anisotropy of the liquid crystal material may be positive or negative, and may be one among pure nematic liquid crystal, chiral nematic liquid crystal and nematic liquid crystal having chiral dopant.

When voltage is applied to two electrodes of the LCD of the present invention, a parabolic electric field is generated between the two electrodes, and the liquid crystal molecules are driven by the electric field.

The liquid crystal display described above is called an electrically-induced optical compensation liquid crystal display (EOC-LCD).

In the EOC-LCD according to the embodiments of the present invention, the liquid crystal molecules are symmetrically aligned to the surface which is equal distance from each of the electrodes. Accordingly, the phase retardation of the transmitted light is symmetrically caused, thereby obtaining a wide viewing angle.

Additional objects and advantages of the present invention are set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, illustrate embodiments of the present invention and, together with the description, serve to explain the principles of the invention.

FIGS. 7 to 17 are graphical illustrations of a viewing angle of an EOC-LCD according to an embodiment of the present invention; and FIG. 18 is a graphical illustration of electro-optical characteristics in an EOC-LCD according to an embodiment of the present invention.

DETAILED DESCRIPTION OF THE PREFERRED EMBODIMENTS

Embodiments of the present invention will become apparent from a study of the following detailed description when viewed in light of the drawings.

Figure 1A:
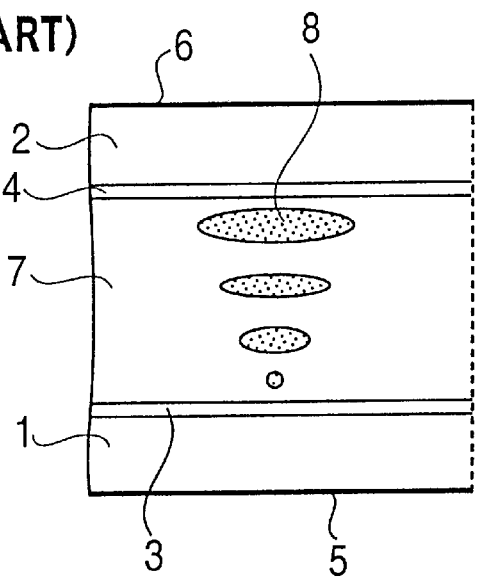
FIGS. 1A and 1B are sectional views of a conventional TN-LCD.
Figure 1B:
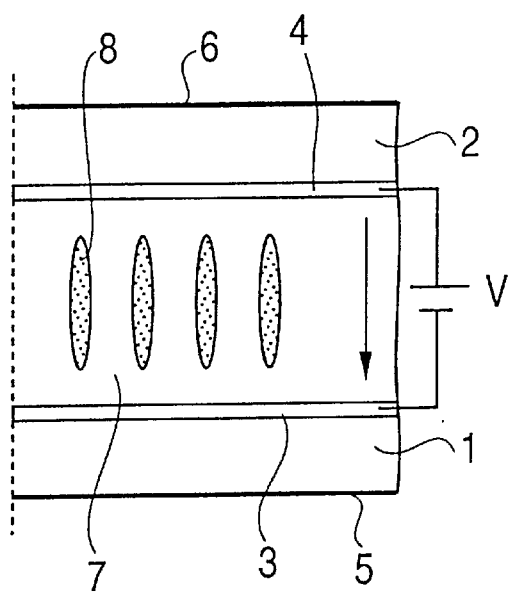
Figure 2A:
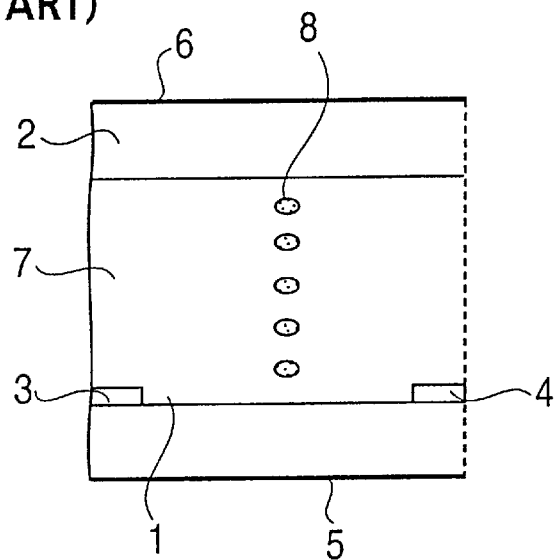
FIGS. 2A and 2B sectional views of a conventional IPS-LCD.
Figure 2B:
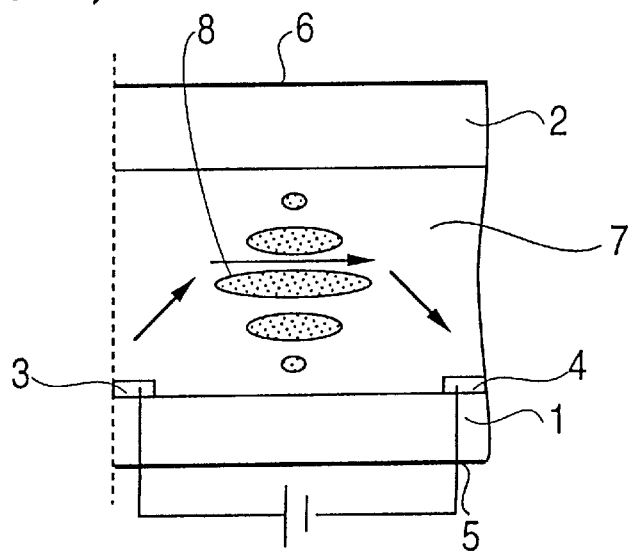
Figure 3A:
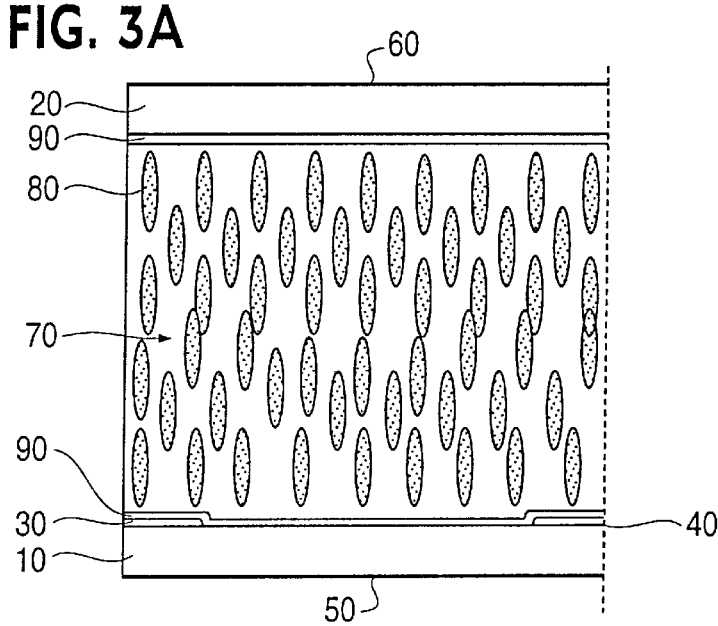
FIGS. 3A to 3C illustrates a basic driving principle of an EOC-LCD according to a first embodiment of the present invention.
Figure 3B:
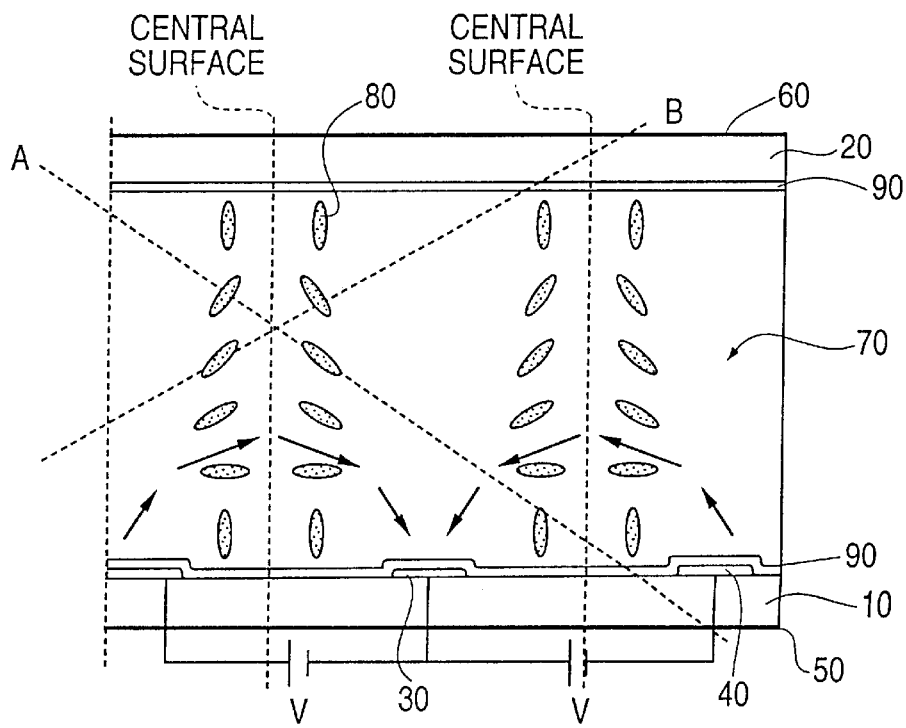
Figure 3C:
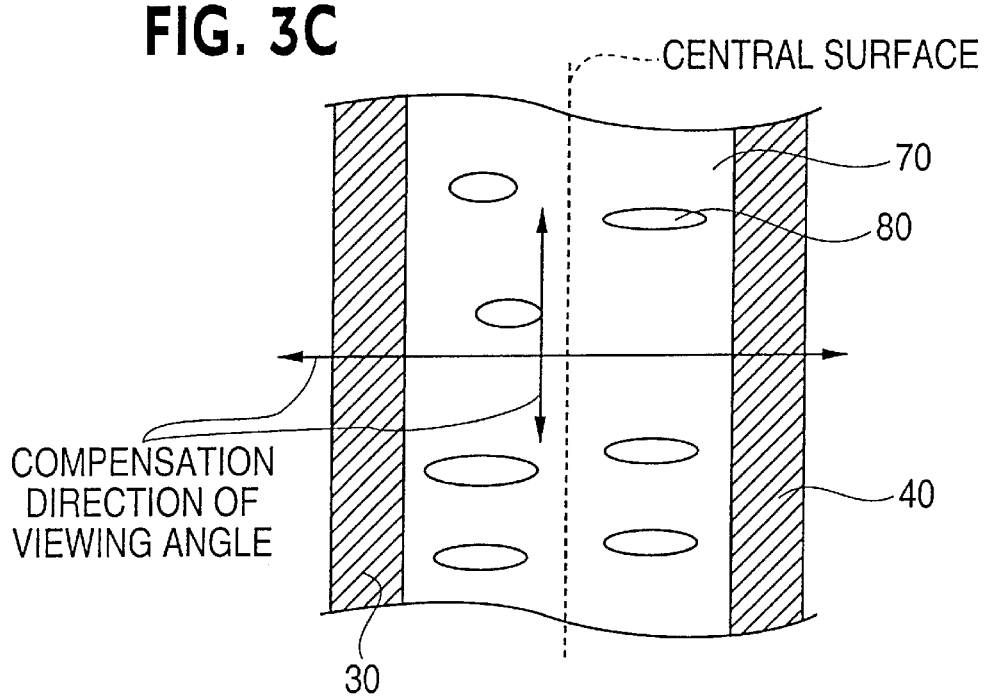
Figure 4C:
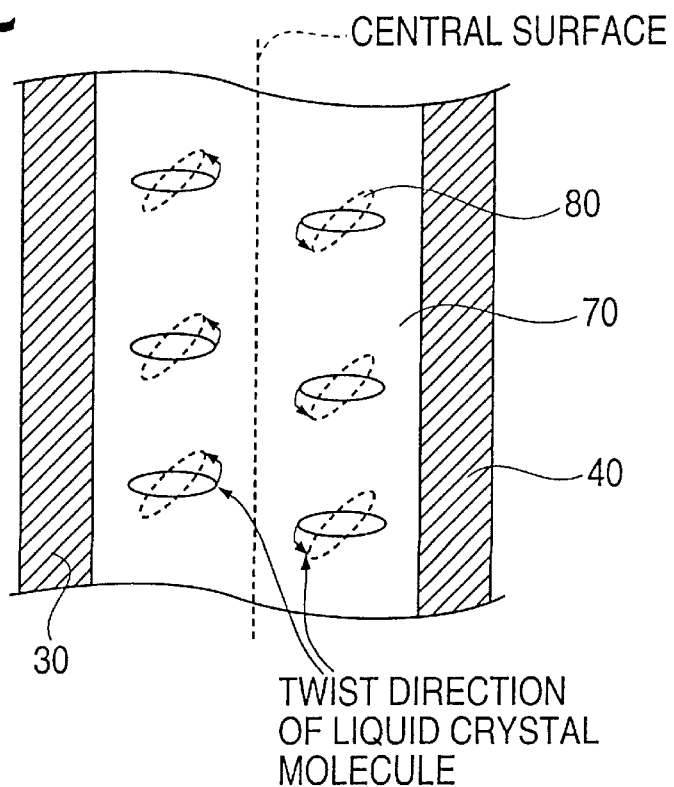
FIGS. 4A to 4C illustrates a basic driving principle of an EOC-LCD according to a second embodiment of the present invention.
Figure 4A:
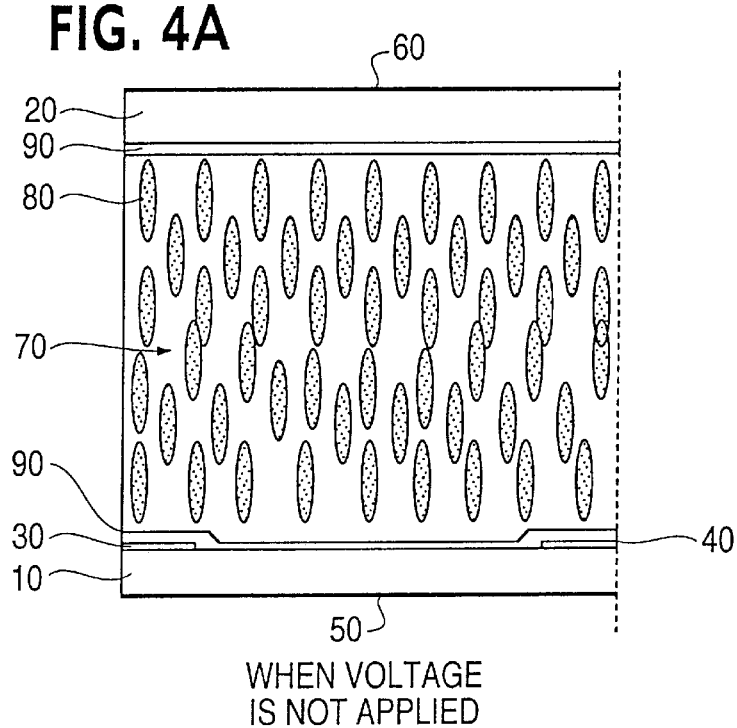
Figure 4B:
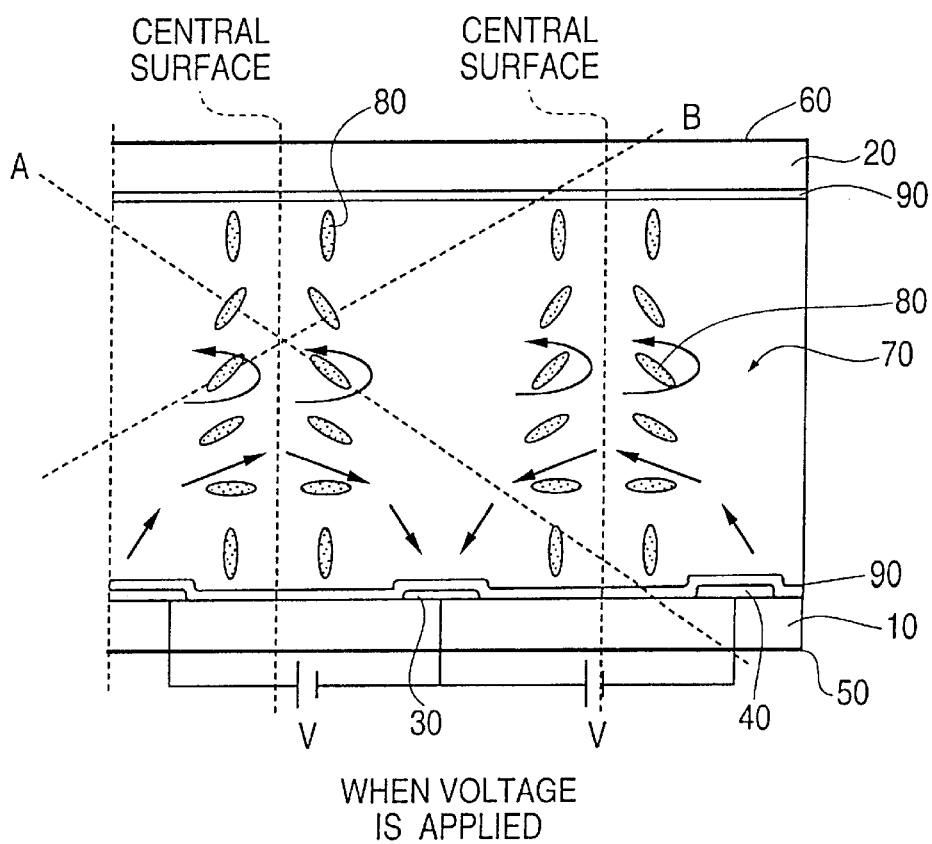

FIGS. 3A to 3C illustrate a basic driving principle of an electrically-induced optical compensation liquid crystal display (EOC-LCD) according to a first embodiment of the present invention, and FIGS. 4A to 4C illustrate a basic driving principle of the EOC-LCD according to a second embodiment of the present invention.

Referring to FIGS. 3A to 3C and 4A to 4C, a pair of transparent glass substrates 10 and 20 having alignment films 90 respectively are formed facing each other. Two linear electrodes 30 and 40 parallel with each other are formed on the inner surface of a lower substrate 10 of the two substrates 10 and 20. The liquid crystal material is injected between the two glass substrates 10 and 20 to form a liquid crystal layer 70. The liquid crystal molecules 80 of the liquid crystal layer 70 are homeotropically aligned and thus are perpendicular to the two substrates 10 and 20. The liquid crystal molecules 80 may have a pre-tilt angle with respect to the two substrates 10 and 20. The two electrodes 30 and 40 may be transparent or opaque conductive material. Two polarizing plates 50 and 60, which polarize the passing light, are attached to the outer surfaces of the glass substrates 10 and 20 respectively.

Generally, one of the two electrodes 30 and 40 is a pixel electrode for applying a different data signal to each pixel unit, and the other is a common electrode for applying a common signal to the entire pixel units. In addition, each pixel electrode is connected to a terminal of a switching device, such as a thin film transistor, formed in each pixel.

The dielectric anisotropy $\Delta\epsilon$ of the liquid crystal material of the liquid crystal layer 70 should preferably be positive, but it may be negative. The liquid crystal material may be one among nematic liquid crystal, chiral nematic liquid crystal and nematic liquid crystal having left-handed or right-handed chiral dopant.

In addition, one or both alignment films 90 may be rubbed so that the liquid crystal molecules 80 may be inclined in a predetermined direction, or none of the alignment films 90 may be rubbed. The rubbing may be done in an arbitrary direction. However, it is preferable to rub the two alignment films in opposite directions when both of them are rubbed.

The transmission axes of the polarizing plates 50 and 60 are parallel with or perpendicular to each other.

In addition, it is preferable to make the width of the electrodes 30 and 40 between 1 and 10 $\mu$m, the distance between the two electrodes 30 and 40 between 2 and 20 $\mu$m, and the thickness of the liquid crystal layer 70 between 1 and 15 $\mu$m.

In FIGS. 3A to 3C. the liquid crystal material is pure nematic liquid crystal which has dielectric anisotropy. In FIGS. 4A to 4C. the liquid crystal material is nematic liquid crystal having chiral dopant and positive anisotropy or chiral nematic liquid crystal having positive anisotropy.

Referring to FIGS. 3A and 4A, when the electric field is not applied, the liquid crystal molecules 80 of the liquid crystal layer 70 are perpendicular to the two substrates 10 and 20 due to the aligning force of the alignment films 90.

The light passing through the polarizing plate 50 attached to the lower substrate 10 passes through the liquid crystal layer 70 without changing its polarization. The same light also passes through the polarizing plate 60 attached to the upper substrate 2 if the transmission axes of the two polarizing plates 50 and 60 are parallel with each other. The same light is blocked by the polarizing plate 60 of the upper substrate 20 if the transmission axes of the two polarizing plates 50 and 60 are perpendicular to each other.

FIGS. 3B and 4B show states of arrangement of the liquid crystal molecules 80 when sufficient electric field is formed, and FIGS. 3C and 4C are elevational views thereof. The electric field at points ("boundary-plane") equal distance from each of the two electrodes 30 and 40 is substantially parallel with the two substrates 10 and 20 and is perpendicular to the two electrodes 30 and 40. As the electric field moves away from the points in question and moves toward either one of the electrodes 30 and 40, it curves gradually more downward. That is, the electric field assumes a downward parabolic shape.

Here, the long axis of the liquid crystal molecules 80 is to be aligned along the direction of the electric field since the nematic liquid crystal material has positive dielectric anisotropy. However, the liquid crystal molecules 80 adjacent to the substrates 10 and 20 maintain their original state, in which they are aligned perpendicularly to the substrates 10 and 20 since the aligning force of the alignment film 90 is stronger than the force of the electric field. Accordingly, a liquid crystal director continuously changes to balance the force of the electric field and the aligning force when the pure nematic liquid crystal material is used.

In addition, the liquid crystal material layer has at least two adjacent regions which is between the two electrodes 30 and 40. The liquid crystal molecules 80 in a region are aligned in the same direction, and the liquid crystal molecules 80 in the two regions are aligned symmetrically with respect to the plane-boundary of the two regions since the electric field between the two electrodes 30 and 40 has parabolic shape as a whole. The plane-boundary is at equal distance from each of the two electrodes 30 and 40 as described above.

Accordingly, referring to FIGS. 3B and 3C, a viewing angle in the direction perpendicular to the two electrodes 30 and 40 is enlarged since the phase retardation of the light passing through the liquid crystal layer 70 is symmetrically compensated. The viewing angle in the direction parallel to the electrodes 30 and 40 is also enlarged since the refractive index in the direction of the short axes of the liquid crystal molecules 80 has little variation.

On the other hand, since the electric field at the surface an equal distance from each of the electrodes 30 and 40 is formed in parallel with the substrates. a discontinuous boundary-plane, in which the liquid crystal molecules do not rotate, is formed at the boundary-plane in question since the force of the electric field is perpendicular to the long axes liquid crystal molecules 80 aligned perpendicularly to the substrates.

Next, as shown in FIGS. 4B and 4C, different effects results when the chiral nematic liquid crystal or the nematic liquid crystal having chiral dopant is used instead of the pure nematic liquid crystal as in FIGS. 3A to 3C. As before, the discontinuous area, in which the liquid crystal molecules 80 do not rotate, is also formed on the boundary-plane equal distance from each of the two electrodes 30 and 40. However, the arrangement of the liquid crystal molecules 80 in both sides of the discontinuous area is not completely symmetrical to each other since the long axis of the liquid crystal molecules 80 is changed by the force resulting from the electric field and the alignment force as well as the force resulting from chirality.

That is, in FIG. 3C, the long axes of the liquid crystal molecules 80 are aligned perpendicularly to the electrodes 30 and 40 when viewed from the top; in contrast, in FIG. 4C, the liquid crystal molecules 80 in both sides of the discontinuous area may rotate either counterclockwise or clockwise. In this case a wide viewing angle is obtained in both parallel and perpendicular direction with the electrodes 30 and 40.

In the above state, the polarization of the polarized light passing through the polarizing plate 50 attached to the lower substrate 10 rotates according to the twist of the liquid crystal director as it passes through the liquid crystal layer 70.

In the above two cases, the polarization can be rotated by ninety degrees by controlling the dielectric anisotropy, the gap between the two substrates 10 and 20, or the pitch of the liquid crystal molecules 80. In this case, if the transmission axis of the two polarizing plates 50 and 60 are parallel with each other, the light is blocked out by the polarizing plate 60 attached to the upper substrate 20. If the transmission axis of the two polarizing plates 50 and 60 are perpendicular to each other, the light passes through the polarizing plate 60 of the upper substrate 20.

To summarize, the liquid crystal molecules 80 are arranged symmetrically with respect to the discontinuous area in the EOC-LCD according to the embodiments of the present invention. Accordingly, the light transmitted in the direction of A and the light transmitted in the direction of B in FIGS. 3B and 48 pass through paths made by the similar arrangement of the liquid crystal molecules 80. Accordingly, a wide viewing angle can be obtained since the retardation with respect to the passing light is formed almost in the same way.

Figure 5:
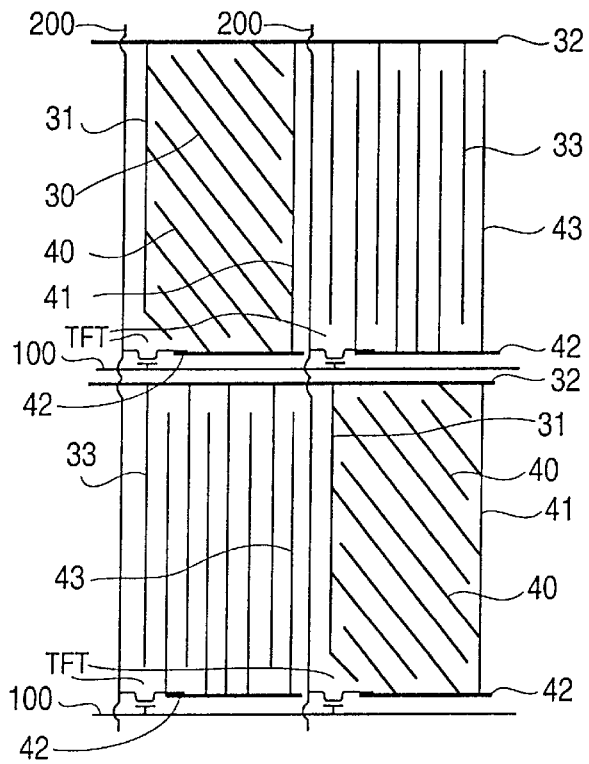
FIG. 5 is a plan view of an electrode formed in a pixel unit in an EOC-LCD according to a third embodiment of the present invention.
Figure 6:
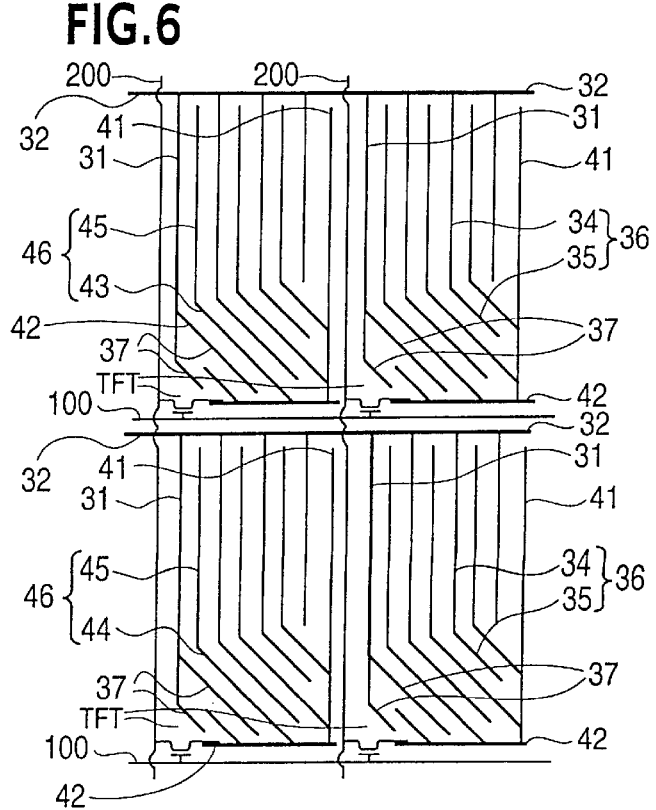
FIG. 6, is a plan view of an electrode formed in a pixel unit in an EOC-LCD according to a fourth embodiment of the present invention.

The structure and the arrangement of the electrodes may be varied in various ways in the above type of LCD; however, it is preferable to form the electrodes as illustrated in FIGS. 5 and 6. Hereinafter, the structure and the arrangement of the electrodes will be explained in detail.

Referring to FIGS. 5 and 6, a gate line 100 is horizontally formed and a data line 200 is formed perpendicularly to the gate line 100 in a pixel. A common electrode line, a first horizontal electrode line 32, is formed in parallel with the gate line 100, and a pixel electrode, a second horizontal electrode line 42, is formed in parallel with the first electrode line 32 in each pixel. A thin film transistor (TFT) is formed near a crossing point of the gate line 100 and the data line 200. A first terminal of the TFT is connected to the gate line 100, a second terminal to the data line 300 and a third terminal to the second horizontal electrode line 42.

In FIG. 5, as mentioned above, first and second horizontal electrode lines 32 and 42 are horizontally formed in parallel with each other in each pixel. Given four pixels as a unit, in two pixels in diagonal to each other, e.g., the upper-right and lower-left pixels, first electrodes 33 and second electrodes 43 are formed alternatively therein in parallel to each other. The first and second electrodes 33 and 43 are connected vertically to the first horizontal electrode line 32 and the second horizontal electrode line 42, respectively.

In the remaining two pixels, a first vertical electrode line 31 and a second vertical electrode line 41, which are connected to the first horizontal electrode line 32 and the second electrode line 42 respectively. are formed therein on the opposite sides. In addition, first electrodes 30 are extended from the first horizontal electrode line 32 and the first vertical electrode line 31, and makes a predetermined angle with the first horizontal electrode line 32 and the first vertical electrode line 31. Second electrodes 40 extended from the second horizontal electrode line 42 and the second vertical electrode line 41 are formed in parallel with the first electrodes 30, and each of second electrode 40 is arranged between two first electrodes 30.

As a result, the first and second electrodes 33 and 43 in a pixel are not parallel with the first and second electrodes 30 and 40 in the adjacent pixel, and make a predetermined angle with respect to each other.

In FIG. 6, the first and second horizontal electrode lines 32 and 42 arc horizontally formed in parallel with each other in each pixel. The first and second vertical electrode lines 31 and 41 are vertically extended from the opposite ends of the first and the second horizontal electrode lines 32 and 42, respectively First electrodes 36 consist of first portions 34 and second portions 35; the first portions 34 extends vertically downward from the first horizontal electrode line 32, and secured portions 3b connected to the first portions 34 are bent towards right. A part of the first vertical electrode line 31 also serves as the first portions 34 of the first electrodes 36, and a plurality of branches 37 extended from the first vertical electrode line 31 are formed in parallel with the second portion 35.

Second electrodes 46 consist of first portions 44 and second portions 45; the first portions 44, extended from the second horizontal electrode line 42 and the second vertical electrode line 41, are formed between and in parallel with the. second portions 35 of the first electrodes 36; the second portions 45 extended from the first portions 44 are formed in parallel with the first portions 34 of the first electrodes 36. A part of the second vertical electrode line 41 serves also as the second portions 45 of the second electrode 46. That is, the first and second electrodes 36 and 46, which are in parallel with each other, are bent in each pixel.

As described above, the long axes of the liquid crystal molecules are aligned in many directions by forming the electrode in various directions in a pixel unit or in a pixel, thereby obtaining a wide viewing angle.

Hereinafter, the examples of the EOC-LCD according to embodiments of the present invention are explained in detail.

EXAMPLE 1

The nematic liquid crystal having chiral dopant and the pure nematic liquid crystal were used as the liquid crystal layer 70, and the resulting viewing angles were measured for each case.

The refractive anisotropy Δn of the liquid crystal layer 70 was 0.09, the thickness d of the liquid crystal layer 70 was 4.5 μm, and the alignment films 90 were not rubbed. In addition, the two electrodes 30 and 40 were horizontally formed, and the transmission axes of the polarizing plates 50 and 60 attached to the outward surfaces of the two substrates 10 and 20 were formed to have an angle of 90° with respect to each other. The transmission axis of one polarizing plate were formed to have an angle of 45° with respect to the two electrodes 30 and 40, and the transmission axis of the other polarizing plate were formed to have an angle of 135° with respect to the two electrodes 30 and 40. The angles have been measured by setting the right side of the horizontal direction as zero degree.

FIG. 7 is a graphical illustration of viewing angles of the EOC-LCD obtained when nematic liquid crystal having chiral dopant of 0.1% was used, Viewing angles of 80° in the horizontal direction and 76° in the vertical direction were measured for a contrast ratio 10.

Figure 8:
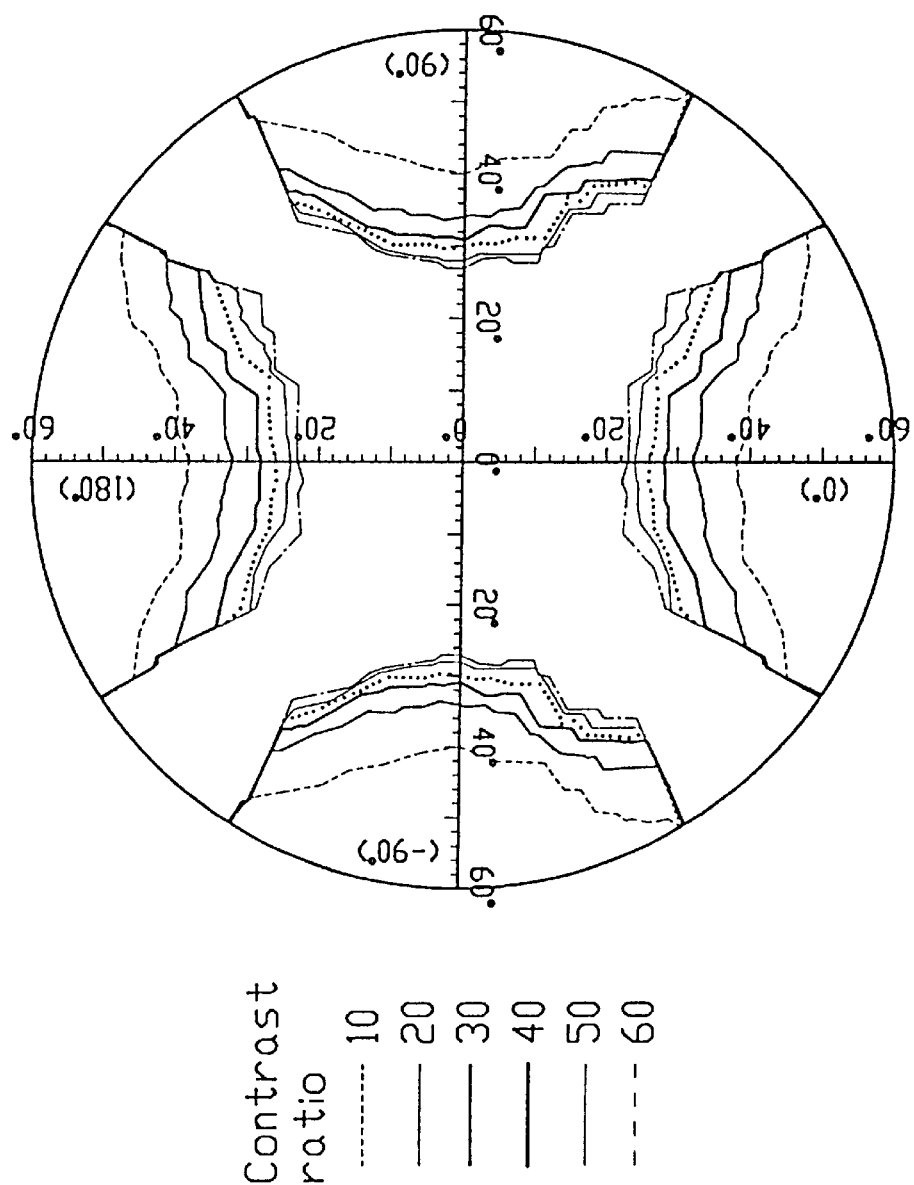

FIG. 8 is a graphical illustration of viewing angles of the EOC-LCD when pure nematic liquid crystal was used. Viewing angles of 76° in the horizontal direction and in the vertical direction were measured for a contrast ratio 10.

The viewing angle of over 120° was measured in a diagonal direction for both cases when the contrast ratio was set to 60°.

EXAMPLE 2

While maintaining the same condition as in example 1, the alignment films 90 formed on the two substrates 10 and 20 were rubbed, and the resulting viewing angles were measured in each case.

FIG. 9 is a graphical illustration of a viewing angle of the EOC-LCD obtained when the alignment film 90 formed on the upper substrate 20 was rubbed in the angle of 135° and when the alignment film 90 formed on the lower substrate 10 is rubbed in the angle of 315°.

Figure 10:
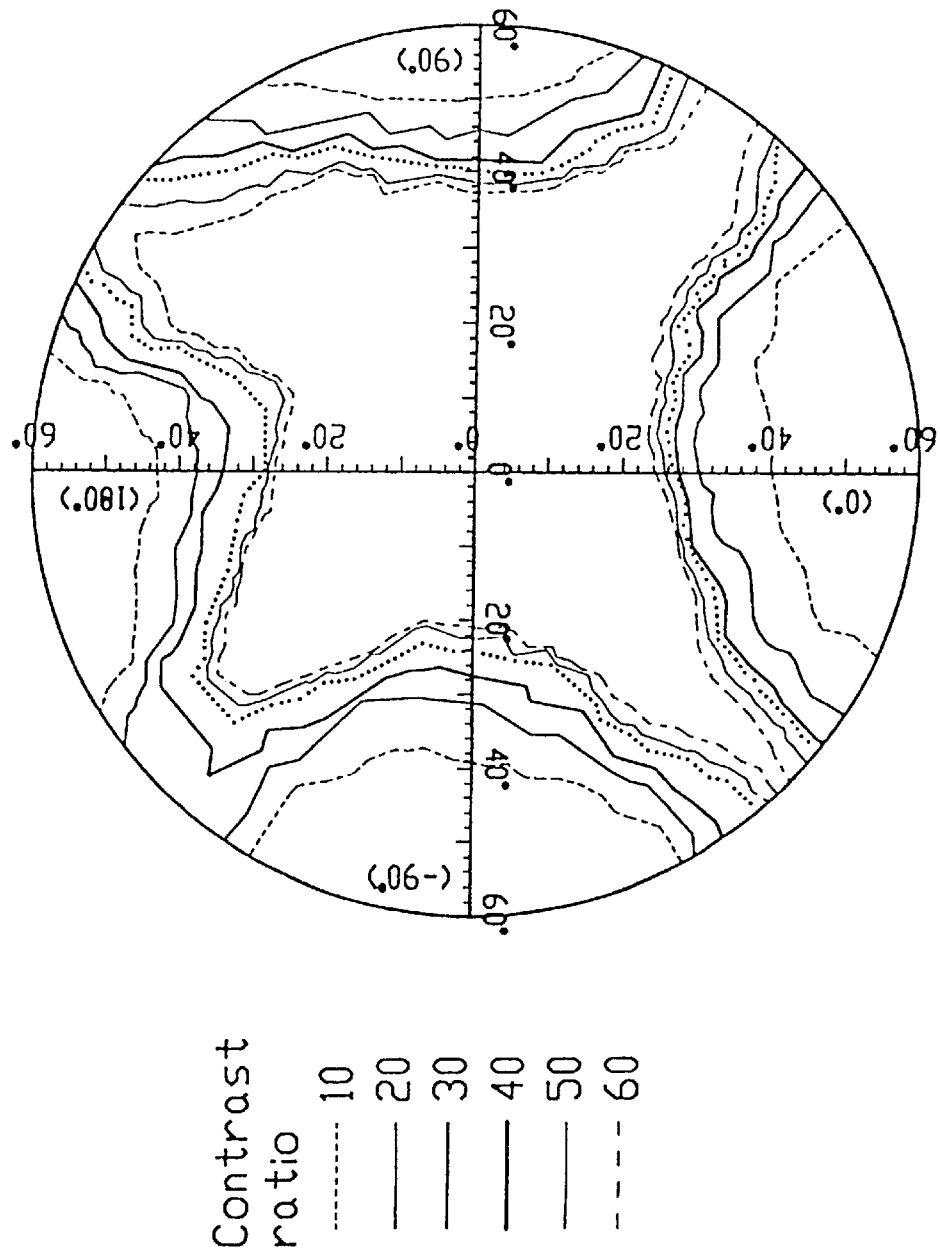

FIG. 10 is a graphical illustration of viewing angles of the EOC-LCD obtained when the alignment film 90 formed on the upper substrate 20 was rubbed in the angle of 45° and the alignment film 90 formed on the lower substrate 10 was rubbed in the angle of 225°.

As shown in FIGS. 9 and 10, more uniform viewing angle can be obtained since the difference between the viewing angles in the horizontal and the vertical direction and the viewing angle in the diagonal direction can be reduced by rubbing the alignment films as described above.

EXAMPLE 3

While maintaining the same condition as in example 1, the viewing angle was measured by varying the orientations of the polarizing plates 50 and 60 attached to the outward surfaces of the two substrates 10 and 20.

Figure 11:
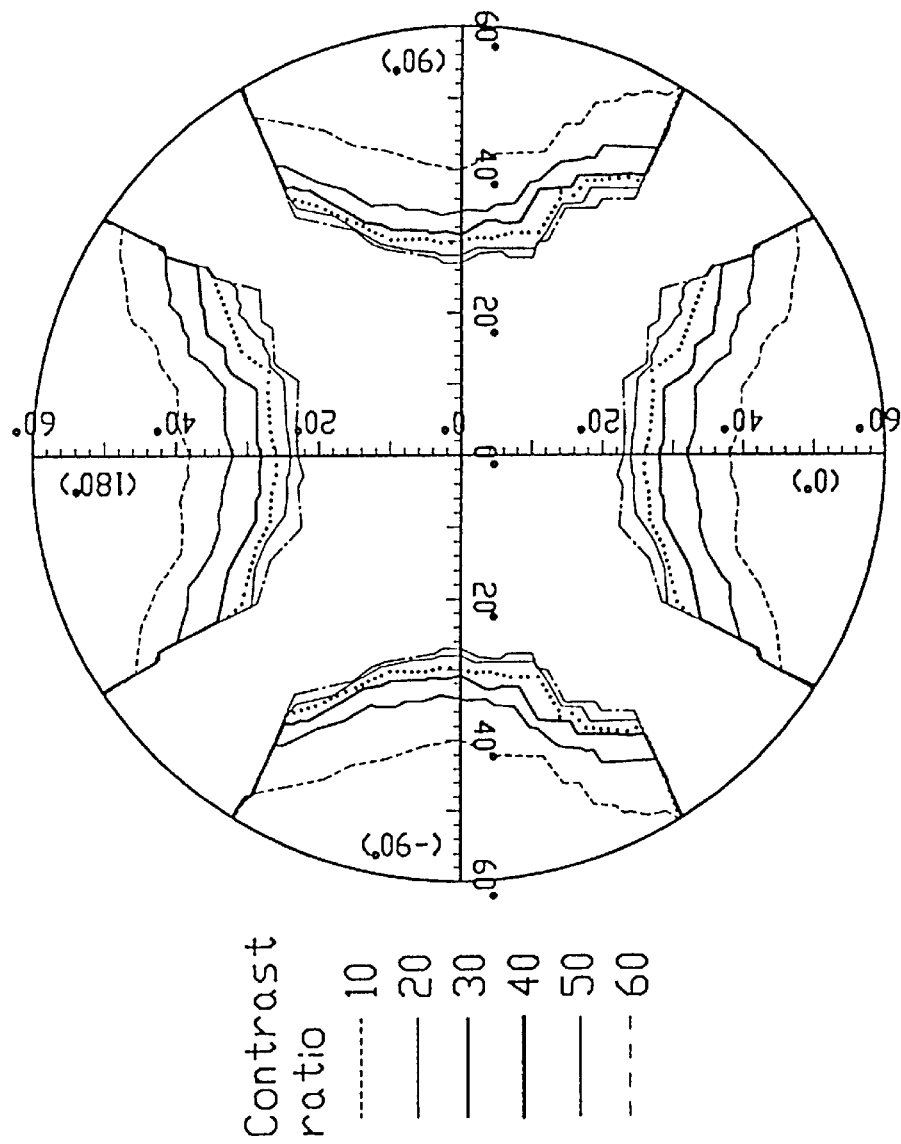

FIG. 11 is a graphical illustration of viewing angles of the EOC-LCD obtained by arranging the transmission axis of the polarizing plates 60 attached to the outward surface of the upper substrates 20 to make an angle of 45° with respect to the direction of the two electrodes 30 and 40, and by arranging the transmission axis of the polarizing plate 50 attached to the lower substrate 10 to make an angle of 135° with respect to the direction of the two electrodes 30 and 40.

Figure 12:
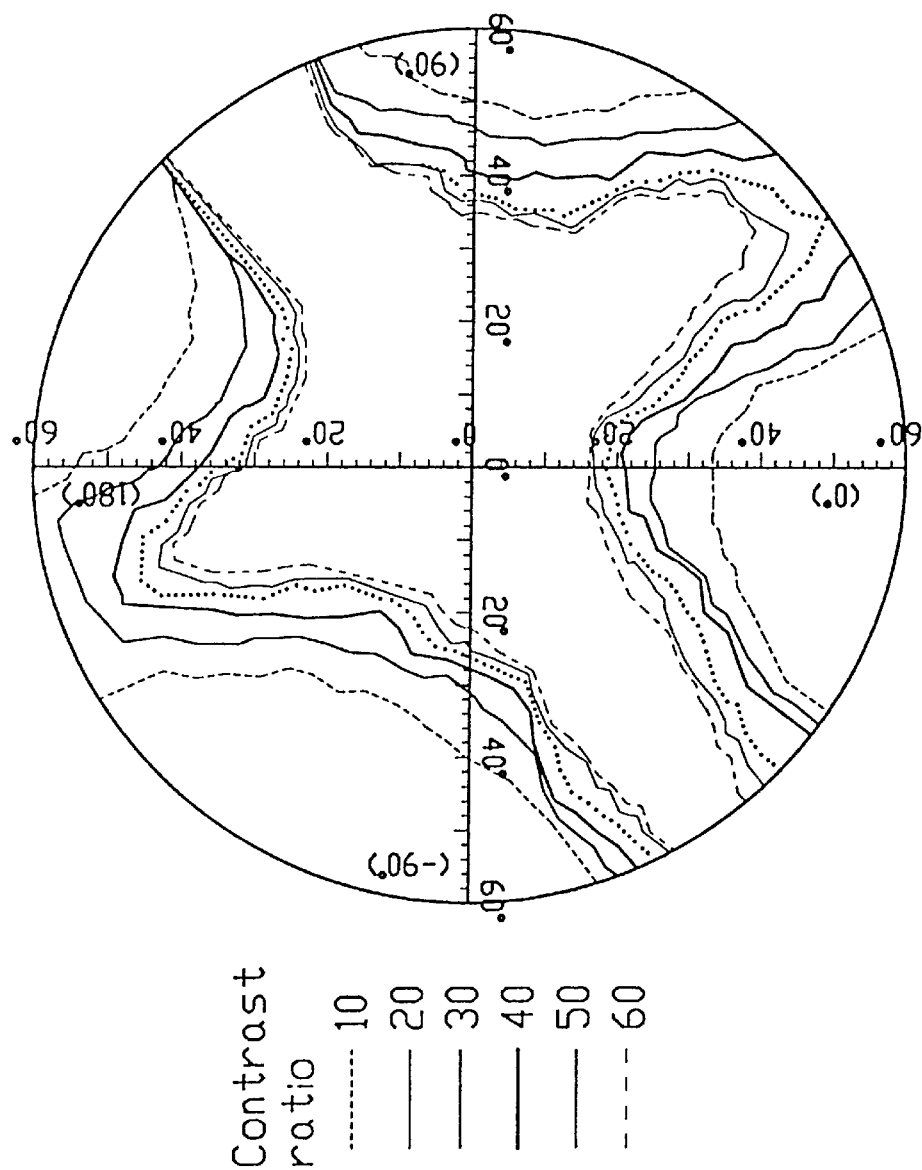

FIG. 12 is a graphical illustration of viewing angles of the EOC-LCD obtained by arranging the transmission axis of the polarizing plates 60 attached to the upper substrates 20 to make an angle of 30° and by arranging the transmission axis of the polarizing plate 50 attached to the lower substrate 10 to make an angle of 120°.

As described in example 1, the viewing angle of over 120° was measured in the four directions of the diagonal line for the contrast ratio 60, and the viewing angle of 80° was measured in every direction for the contrast ratio 10 in FIG. 11. When comparing the results of FIG. 11 and FIG. 12, the viewing angle depends on the angle between the electrodes and the transmission axis of the polarizing plate. Accordingly. an almost uniform viewing angle can be obtained in every direction by adjusting the direction of the electrodes and the direction of the transmission axis of the polarizing plates in various ways.

EXAMPLE 4

Figure 13:
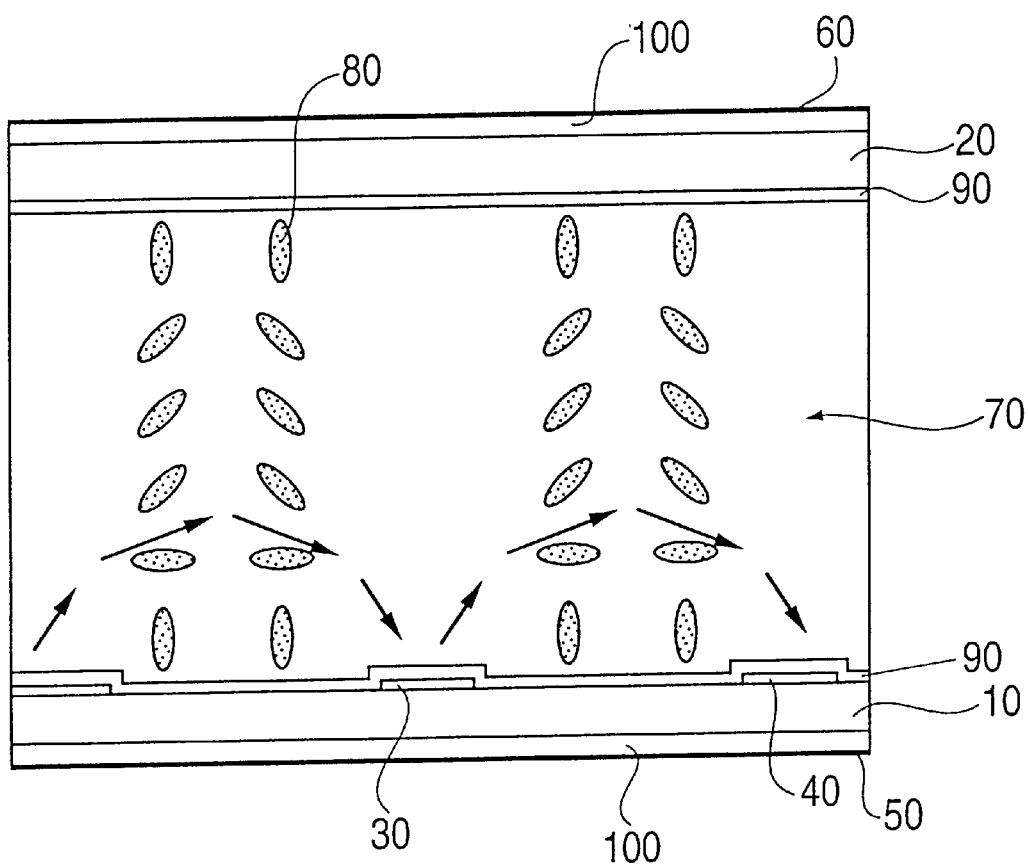

While maintaining the same conditions as in example 1, the viewing angle was measured when negative uniaxial compensation film 100 were attached to the outer surfaces of the two substrates 10 and 20 as illustrated in FIG. 13. The compensation film was used for compensating the residual phase difference of the retardation.

Figure 14:
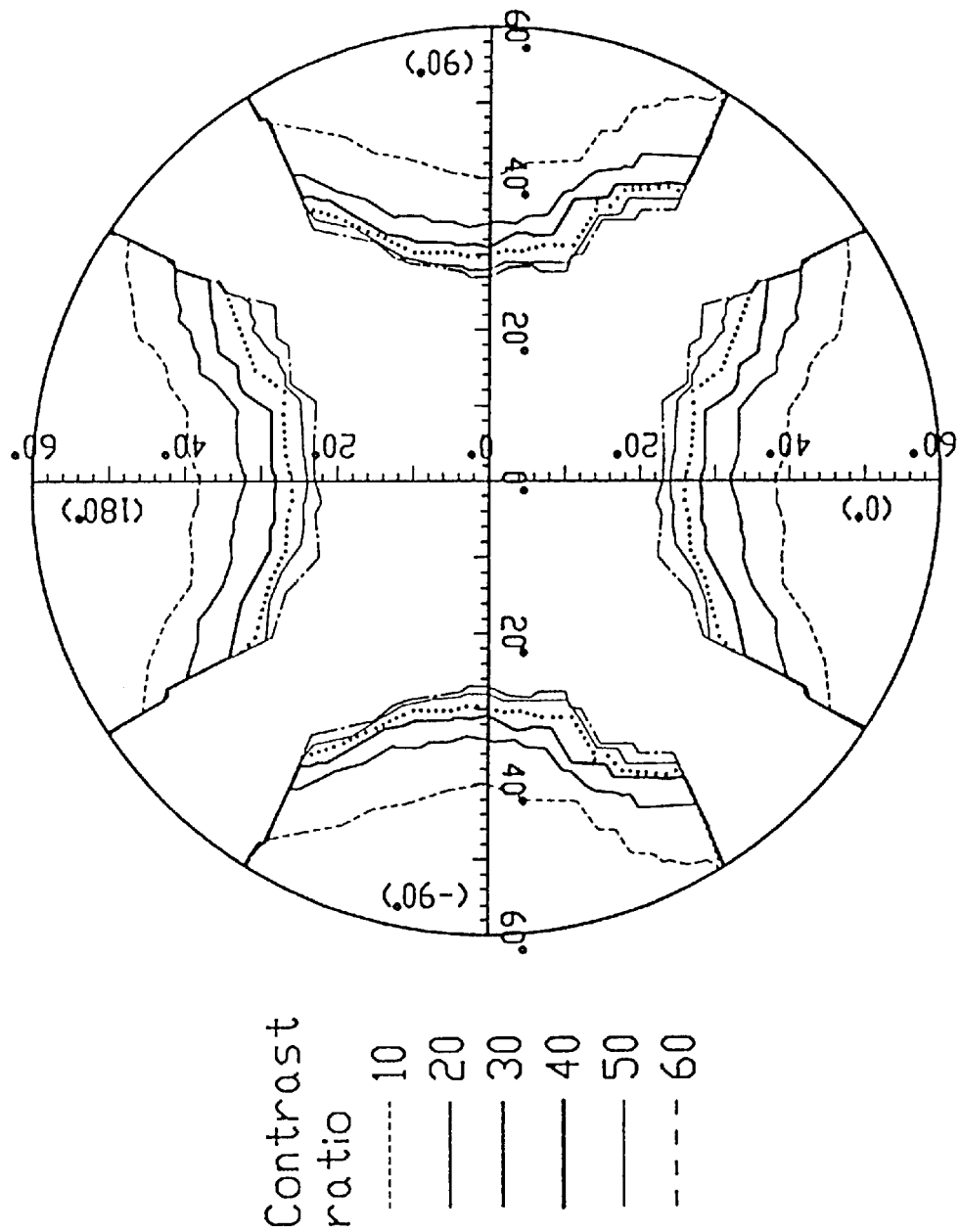
Figure 15:
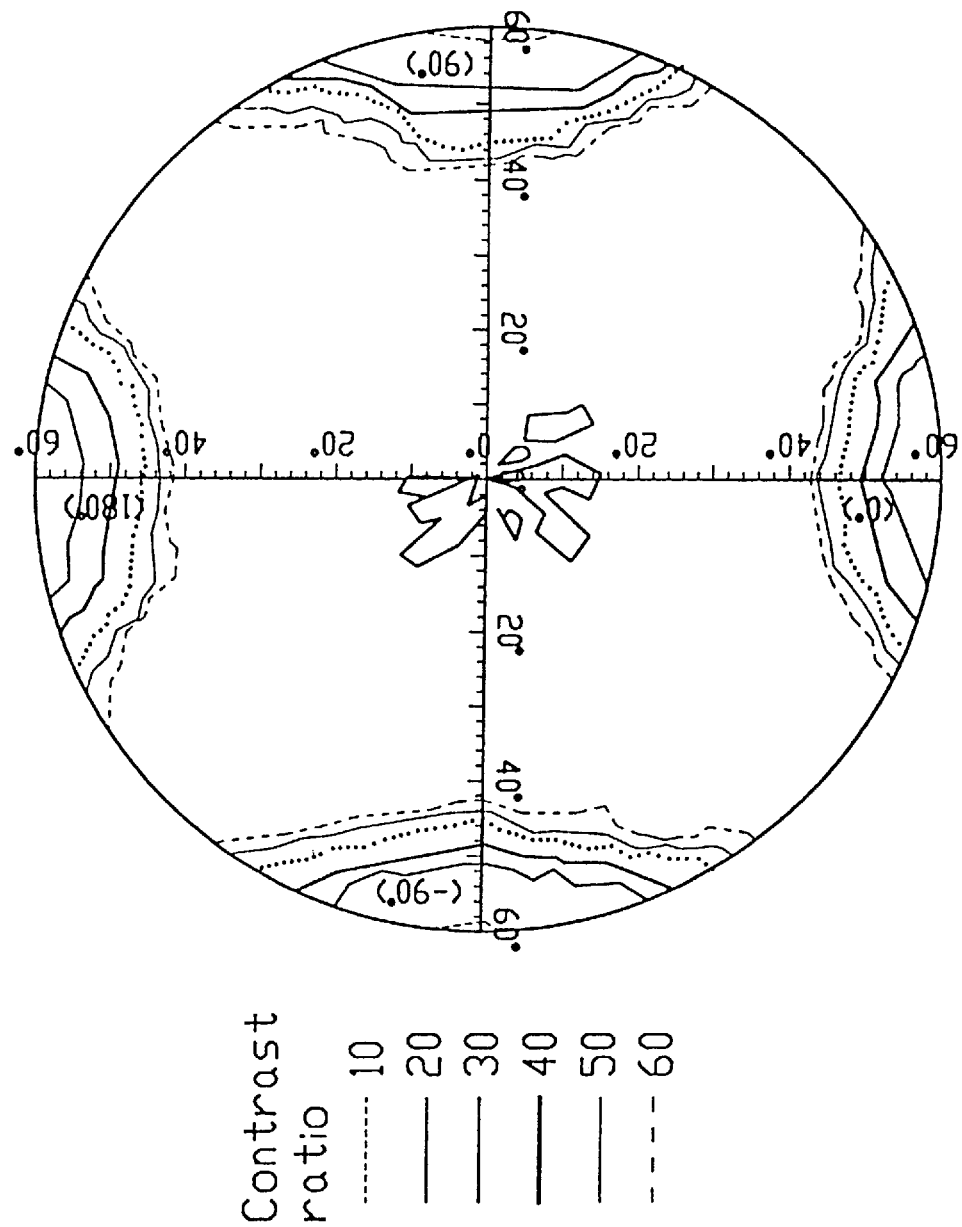
Figure 16:
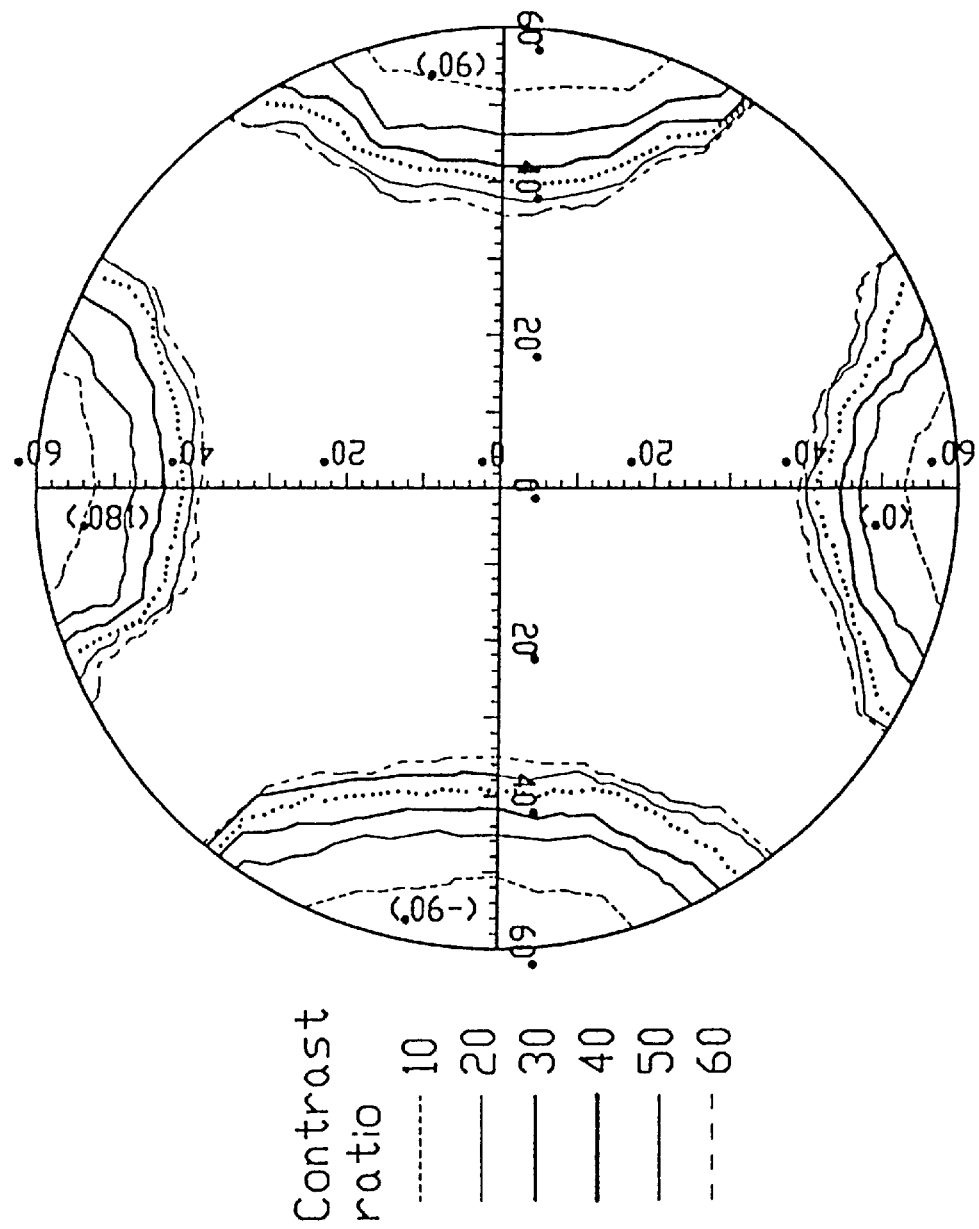
Figure 17:
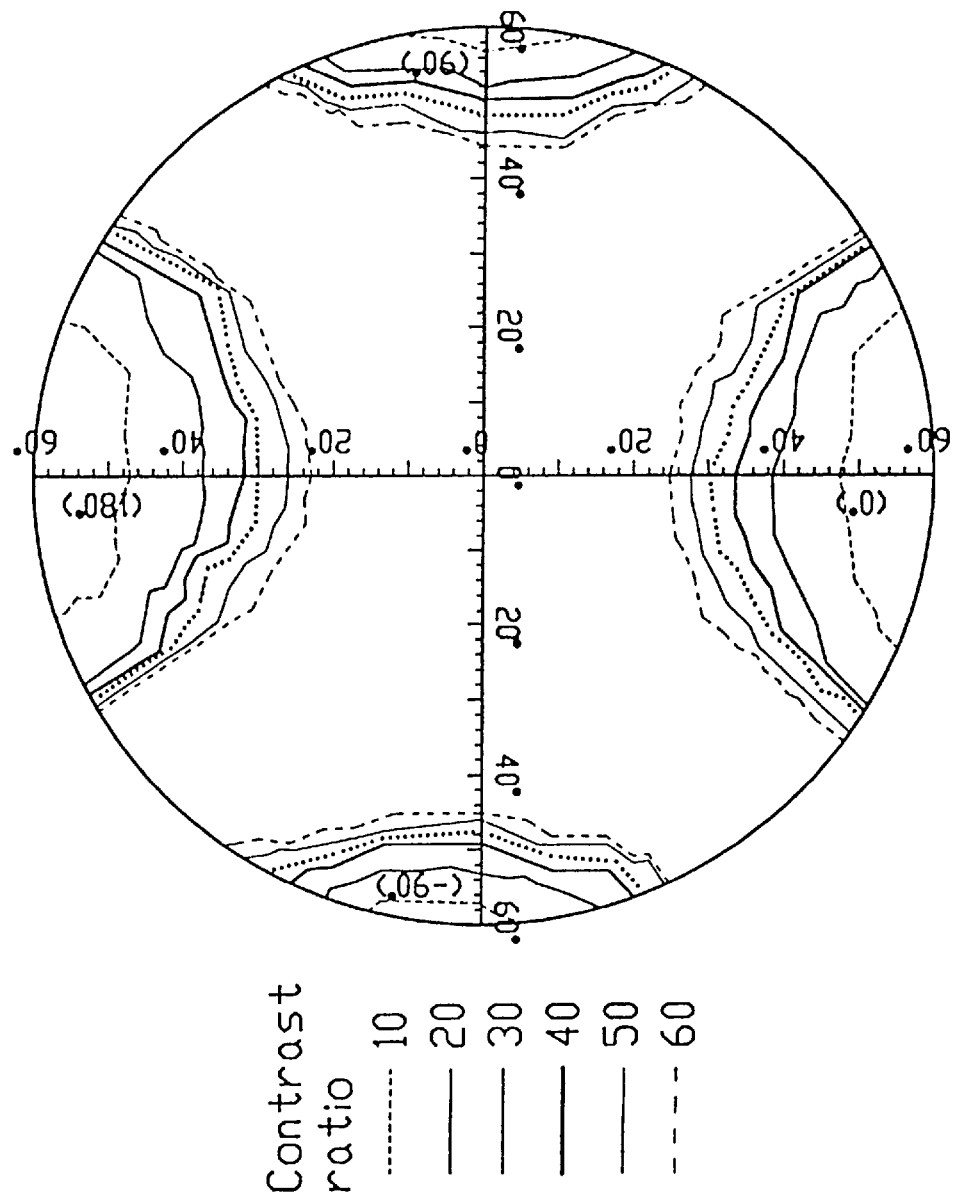

As shown in FIG. 14, when the compensation film 100 was not used, the viewing angle of 80° was measured. FIG. 15 shows the viewing angle measured when the compensation film 100 having the retardation value of to 40 nm was used. FIG. 16 shows the viewing angle measured when the compensation film 100 having the retardation value of 80 nm was used. FIG. 17 shows the viewing angle measured when the compensation film 100 having the retardation value of 120 nm was used.

In FIGS. 15 to 17. the viewing angle were increased to 60° for the contrast ratio 10 when the compensation film 100 was used.

From the above results, it can be seen that the viewing angle of over 60° can be obtained in every direction by optimizing the gap between the two substrates 10 and 20 and the retardation value of the compensation film 100. The retardation value of the compensation film should preferably be 30 to 500 nm.

Although the embodiments of the present invention uses a negative uniaxial compensation film, a positive uniaxial compensation film, a biaxial compensation film, a compensation film having a hybrid structure, or a compensation film having a twisted structure may be used.

In addition, although the compensation films 100 are attached to the two substrates 10 and 20 in the embodiment of the present invention, it may be attached to only one substrate.

EXAMPLE 5

The electric-optical characteristics were measured. The pure nematic liquid crystal was used as the liquid crystal layer 70, the alignment films 90 were not rubbed, and the width of the two electrodes 30 and 40 was 5 $\mu$m respectively.

FIG. 18 is a graphical illustration of relation among the gap between the two substrates, the distance between the two electrodes and the driving voltage according to an embodiment of the present invention.

Here, $V_{max}$ is the driving voltage for obtaining the maximum transmittance, $T_{max}$ is the maximum transmittance, $t_{on}$ is a response time of the liquid crystal molecules when power is turned ON, $t_{off}$ is the response time of the liquid crystal molecules when power is turned OFF, $t_{tot}=t_{on}+t_{off}$, $V_{10}$ is the driving voltage when the transmittance has 10% of the maximum value, and $V_{90}$ is the driving voltage when the transmittance has 90% of the maximum value.

In FIG. 18, the driving voltage for obtaining the maximum transmittance is 6 to 30V when the gap between the two substrates 10 and 20 is between 3 and 6 $\mu$m, and the distance between the two electrodes 30 and 40 is 8 or 10 $\mu$m.

As described above, the driving voltage can be lowered by properly controlling the distance between the electrodes and the gap between the two substrates.

In the EOC-LCD according to embodiments of the present invention, the two electrodes are formed in one of the two substrates, the liquid crystal molecules are aligned perpendicularly to the electrodes. and the liquid crystal director is driven by the electric field formed in the shape of parabola between the two electrodes. Here, the liquid crystal molecules of the liquid crystal layer on the boundary-plane an equal distance from each of the two electrodes are aligned symmetrically. Accordingly, the wide viewing angle can be obtained since the retardation of the light is symmetrically compensated.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A liquid crystal display, comprising:
   a first substrate and a second substrate facing each other;
   a liquid crystal material layer injected between the first and the second substrate and aligned homeotropically, the liquid crystal material layer consisting essentially of a liquid crystal material;
   at least two electrodes parallel with each other formed on either the first or the second substrate;
   polarizing plates attached to surfaces of the first and second substrates, respectively; and
   alignment films formed on the first and second substrates for aligning liquid crystal molecular axes of the liquid crystal material layer perpendicularly to the substrates,
   wherein the transmission axes of the polarizing plates are perpendicular to or parallel with each other,
   wherein the liquid crystal molecules of the liquid crystal material layer have a pre-tilt angle, and
   wherein the difference is below 30V between a driving voltage applied to the electrodes when the light passing through the liquid crystal material layer and the polarizing plates has the maximum transmittance and a driving voltage applied to the electrode when the light passing through the liquid crystal material layer and the polarizing plates has a minimum transmittance.

2. A liquid crystal display, comprising:
   a first substrate and a second substrate facing each other;
   a liquid crystal material layer injected between the first and the second substrate and aligned homeotropically; and
   at least two electrodes parallel with each other formed on either the first or the second substrate,
   wherein the electrodes in a pixel unit are bent.

* * * * *